United States Patent [19]

Ohta et al.

[11] Patent Number: 4,724,001
[45] Date of Patent: Feb. 9, 1988

[54] DISAZOIC DYE AND RECORDING LIQUID CONTAINING THE SAME

[75] Inventors: Tokuya Ohta; Masatsune Kobayashi; Yuko Suga; Konoe Miura; Hiroshi Takimoto, all of Yokohama; Tomio Yoneyama, Kawasaki, all of Japan

[73] Assignees: Canon Kabushiki Kaisha; Mitsubishi Chemical Industries Limited, both of Tokyo, Japan

[21] Appl. No.: 860,335

[22] Filed: May 7, 1986

[30] Foreign Application Priority Data

May 14, 1985 [JP] Japan .................................. 60-102466
May 14, 1985 [JP] Japan .................................. 60-102467

[51] Int. Cl.$^4$ ................................................. C09D 11/02
[52] U.S. Cl. ......................................... 106/22; 106/20
[58] Field of Search .................... 106/22, 20; 534/816

[56] References Cited

U.S. PATENT DOCUMENTS 4,557,761 12/1985 Kobayashi et al. .................. 106/22

OTHER PUBLICATIONS

Derwent Abstract Accession No. 86–018597/03, Japanese Patent No. 60243176, Mar. 12, 1985.

Primary Examiner—Amelia Burgess Yarbrough
Attorney, Agent, or Firm—Fitzpatrick, Cella, Harper & Scinto

[57] ABSTRACT

A naphthalenedisazoic dye represented by general formula (I);

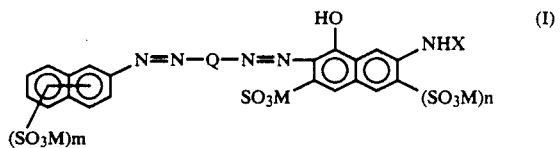

wherein Q represents

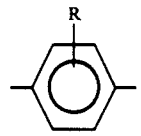

or a naphthalene group substituted by —SO$_3$M; R represents a methyl group, a methoxy group, an ethoxy group; X represents a hydrogen atom, a phenyl group substituted by —SO$_3$M; m represents 1 or 2; n represents 1 when X represents a hydrogen atom and n represents zero when X represents a phenyl group substituted by —SO$_3$M, wherein X represents a hydrogen atom and m represents 1 when Q represents a naphthalene group substituted by —SO$_3$M; and M represents an alkali metal atom, an ammonium, or H.A (wherein A represents an amine), and a recording liquid containing the dye. The recording liquid is suitable for use in an ink-jet recording system.

23 Claims, 5 Drawing Figures

DISAZOIC DYE AND RECORDING LIQUID CONTAINING THE SAME

FIELD OF THE INVENTION

This invention relates to a black naphthalenedisazoic dye and a recording liquid containing the dye. More specifically, the invention relates to a novel dye and a recording liquid containing the dye particularly suitable for use in a recording system wherein recording is performed by ejecting recording liquid droplets through fine spouts (discharging orifices) of a recording head.

BACKGROUND OF THE INVENTION

For recording on recording media such as papers, etc., by writing instruments (e.g., a fountain pen, a felt pen, etc.), there have hitherto been used inks, which are solutions of various dyes dissolved in water or organic solvents.

It is also known that in a so-called ink-jet recording system wherein recording is performed by ejecting a recording liquid in a recording head through discharging orifices by vibration of piezo oscillators, the electrostatic attraction caused by the application of a high voltage, etc., recording liquids obtained by dissolving various dyes in water or organic solvents are used. However, for the ink-jet recording liquid, more stringent performance characteristics are requested than for a general writing ink for writing instruments such as a fountain pen, a felt pen, etc.

In such a recording system recording is performed by ejecting droplets of a recording liquid (a recording ink) onto a recording media. A recording liquid is fundamentally composed of a recording agent (a dye or a pigment) and a liquid medium (water, an organic solvent or a mixture of them) for dissolving or dispersing the recording agent and, if necessary, various additives are added to the recording liquid.

Preferred conditions required for this kind of recording liquid are as follows:

(1) The recording liquid possesses liquid properties (viscosity, surface tension, electric conductivity, etc.) matching the discharging conditions (a driving voltage and a driving frequency of a piezo electric element, the form and material of orifices, the diameter of orifices, etc.), (2) The recording liquid can be stored for a long period of time and does not cause clogging of orifices during use.

(3) The recording liquid is quickly fixed onto recording media such as papers, films, etc., the outlines of the resulting ink dots are smooth, and blotting of the dotted ink is minimized.

(4) the recorded image of the recording liquid has a clear color tone and a high density.

(5) The recorded image of the recording liquid has excellent water resistance and light resistance.

(6) The recording liquid does not attack or erode surrounding materials (the container for the recording liquid, connecting tubes for discharging orifices, sealants, etc.)

(7) The recording liquid has no unpleasant smell, toxicity, inflammability, etc.

As this kind of recording liquid, there are known solutions or dispersions of various dyes or pigments in aqueous or nonaqueous solvents as disclosed, for example, in Japanese Patent Publication No. Sho-52-13127, U.S. Pat. Nos. 3,846,141, 3,705,043 and 3,870,528, etc.

However, a completely satisfactory recording liquid has not yet been obtained.

As black dyes for use in these recording liquids, following dyes (1) to (6) are known.

(Food Black —2)

However, such known dyes have various problems with stability during storage for a long period of time, clogging of orifies, etc.

SUMMARY OF THE INVENTION

The object of the present invention is to provide a dye and a recording liquid containing the dye which satisfy foregoing conditions (1) to (7) at the same time.

The dye which is used in the recording liquid is a naphthalenedisazoic dye represented by the following formula (I):

wherein Q represents or a naphthalene group substituted by —SO$_3$M; R represents a methyl group, a methoxy group or an ethoxy group; X represents a hydrogen atom, a phenyl group substituted by —SO$_3$M; m represents 1 or 2; n represents 1 when X represents a hydrogen atom and represents zero when X represents a phenyl group substituted by —SO$_3$M, wherein X represents a hydrogen atom and m represents 1 when Q represents a naphthalene group substituted by —SO$_3$M; and M represents an alkali metal atom, an ammonium, or H.A. (wherein A represents an amine).

The recording liquid of the present invention comprises at least one of naphthalenedisazoic dyes represented by above-described formula (I) as a recording agent which forms a recording image and a liquid medium for dissolving or dispersing the recording agent.

DESCRIPTION OF THE PREFERRED EMBODIMENT

Examples of the alkali metal atom shown by M in formula (I) are lithium atom, sodium atom, potassium atom, etc., and examples of the amine shown by A include N(C$_2$H$_4$OH)$_3$, N(CH$_3$)$_3$ and N(C$_2$H$_5$)$_3$.

The dye represented by formula (I) wherein Q represents 1,4-naphthalene group substituted by —SO$_3$M can be represented by the following formula (A);

(A)

wherein M represents an alkali metal atom, ammonium or H.A (wherein A represents an amine).

Examples for dyes represented by formula (A) include the following dyes. Among these examples of the dye, dye No. 1 is especially preferred as a dye for the recording liquid. λmax (maximum adsorption wave length) of the dyes were measured in water (unit: nm).

No. 1

λ max 588

No. 2

λ max 588

No. 3  λ max 587

No. 4  λ max 586

$M': \overset{\oplus}{N}H(C_2H_4OH)_3$

No. 5  λ max 585

The dye represented by formula (I) wherein Q represents can be represented by the following formula (B);

phenyl group substituted by —$SO_3M$; m represents 1 or 2; n represents 1 when X represents a hydrogen atom and n represents zero when X represents a phenyl group substituted by —$SO_3M$; and M represents an alkali metal atom, an ammonium, or H.A (wherein A represents an amine).

Examples for dyes represented by formula (B) include the following dyes. Among these examples of the dyes, dye No. 6 and No. 7 are more preferable for a dye for the recording liquid.

(B)

wherein R represents a methyl group, a methoxy group, an ethoxy group; X represents a hydrogen atom, a

λmax (maximum adsorption wave length) of the dyes were measured in water (unit: nm).

No. 6

λmax 470, 556

-continued

No. 7

λmax 476,568

No. 8

λmax 421,558

No. 9

λmax 492,574

No. 10

λmax 418,558

No. 11

λmax 418,563

No. 12

λmax 474,560

No. 13

λmax 492,575

The dyes shown by general formula (I) for use in this invention can be prepared by the method shown below in accordance with the method described, for example, in Yutaka Hosoda, *Shin Senryo Kagaku* (*New Dyestuff Chemistry*), page 397, line 27 to page 398, line 19, published by Gihodo Co., Dec. 21, 1973.

That is, a monoazo compound represented by general formula (IV) or (IV').

(IV)

or (IV')

(wherein M and R have the same meanings as defined above) is first prepared by diazotizing an amine represented by general formula (II);

II

(wherein M has the same meaning as defined above) in a mineral acid such as hydrochloric acid, sulfuric acid, etc., using sodium nitrite and then coupling the diazotized product with an amine represented by general formula (III) or (III'):

(III)

or (III')

Then, the disazo compound of formula (VI) or (VI') is easily obtained by diazotizing the monoazo compound prepared in the above step in a mineral acid such as hydrochloric acid, sulfuric acid, etc., using sodium nitrite, etc., and then coupling the diazotized product with a naphthol derivative represented by general formula (V);

(V)

In formula (II), (III), (III'), (IV), (IV') and (V), X, M, R, m, and n have the same meanings as defined above.

The recording liquid containing the dye shown above is clearly superior to that containing a conventional dye which is similar to the dye shown above and having formula (1), (2), (3), (4), (5), or (6), especially in stability during storage for a long period of time, causing no clogging of orifices, light resistance and water resistance among the above described required conditions.

Prevention of clogging of orifices is a very important subject matter in the ink-jet recording system from a viewpoint of reliability thereof. Hitherto it has been prevented mainly by using mechanical method such as an auto-capping method (surrounding a nozzle with a saturated vapor while the nozzle is not used) or a method using a hand-operated pump. However, such methods do not provide satisfactory effects at present.

In the ink-jet recording liquid a liquid medium mainly comprising of water is used from a viewpoint of safety. Generally, a low volatile water soluble organic solvent such as a glycol is used as a wetting agent. Solubility of dyes to these liquid media changes very responsively according to the chemical structure of the dyes, and solubility of dyes in water and in a glycol have a tendency to be contrary to each other. At the top of the nozzle there is a tendency for water which is a highly volatile component volatize to make the concentration of the glycol high. Therefore, if the recording liquid contains a dye having a low solubility to a glycol, there is a large potential for clogging the nozzle by precipitation of the dye.

The above-described conventional dyes (1) to (6) have a good solubility in water, however, they are inferior in solubility in a glycol. On the other hand the dyes of the present invention which are represented by formula (I) have an improved solubility in a glycol while maintaining their solubility in water to be in the range sufficient for practical use. Therefore, the recording liquid containing the dyes of the present invention hardly causes clogging of a nozzle.

The content of the dye in the recording liquid of this invention is determined according to the nature of the liquid medium component, the characteristics required for the recording liquid, etc., but is generally in the range of 0.1 to 20% by weight, preferably 0.5 to 15% by weight, more preferably 1 to 10% by weight to the total weight of the recording liquid.

The dyes in this invention can be used solely or as a combination of two or more kinds of them, or further may be used as the indispensable component together with other dye or dyes such as a direct dye, an acid dye, etc. the amount of such conventional dyes which can be used together with the dye of this invention is usually 0 to 30% by weight of the dye for use in this invention.

As a liquid medium component for the recording liquid of this invention, water or a mixture of water and a water-soluble organic solvent or solvents is used. Examples of the water-soluble organic solvents which can be used for the recording liquids of this invention are alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol, isobutyl alcohol, etc.; amides such as dimethylformamide, dimethylacetamide, etc.; ketones or ketone alcohols such as acetone, diacetone alcohol, etc.; ethers such as tetra-hydrofuran, dioxane, etc.; nitrogen-containing heterocyclic ketones such as N-methyl-2-pyrrolidone, 1,3-dimethyl-2-imidazolidinone, etc.; polyalkylene glycols such as polyethylene glycol, polypropylene glycol, etc.; alkylene glycols the alkylene moiety of which has 2 to 6 carbon atoms, such as ethylene glycol, propylene glycol, butylene glycol, triethylene glycol, 1,2,6-hexantriol, thiodiglycol, hexylene glycol, diethylene glycol, etc.; glycerol; lower alkyl ethers (the alkyl moiety having usually 1 to 4 carbon atoms) of polyhydric alcohols such as ethylene glycol methyl ether, diethylene glycol methyl (or ethyl) ether, triethylene glycol monomethyl (or ethyl) ether, etc.

The content of the foregoing water-soluble organic solvent in the recording liquid is usually in the range of 5 to 89.9% by weight, preferably 10 to 80% by weight, more preferably 20 to 50% by weight of the total weight of the recording liquid.

In this case, the content of water is determined in a wide range according to the nature of the foregoing solvent component, the composition of the solvents, and the desired characteristics of the recording liquid but is usually in the range of 10 to 90% by weight, preferably 10 to 70% by weight, more preferably 20 to 70% by weight.

The recording liquid of this invention can be easily prepared in mixing the necessary components by an ordinary manner without the need of any troublesome procedures.

The recording liquids of this invention have excellent balance by themselves in recording characteristics (e.g., a recording response, a stability of droplet formation, a discharging stability, a long continuous recording property, a discharging stability after resting the recording for a long period of time, etc.), a storage stability, a fixing property onto recording media, and the light resistance, weather resistance, water resistance, etc., of recorded images but for further improving these properties, the recording liquids may contain various additives conventionally known in the field of the art.

Examples of these additives are viscosity controlling agents (for usually imparting a viscosity of 1 to 20 c.p. to the recording liquids), such as polyvinyl alcohol, celluloses, water-soluble resins, etc.; surface tension controlling agents (for preferably adjusting the surface tension of the recording liquids to 40 to 65 dynes/cm), such as various cationic, anionic or nonionic surface active agents, diethanolamine, triethanolamine, etc.; pH-controlling agents (for preferably adjusting the pH of the recording liquids to 4 to 10), such as buffers; and fungicides such as sodium dehydroacetoacetate, 1,2-benzisothiazolin-3-one, 6-acetoxy-2,4-dimethylmetadioxane, etc.).

Also, for preparing the recording liquid of this invention which is used for an ink-jet recording system of a type that a recording liquid is charged with electricity, a specific resistance controlling agent such as an inorganic salt (e.g., lithium chloride, ammonium chloride, sodium chloride, etc.), etc., is added to the recording liquid.

Furthermore, when the recording liquid of this invention is applied to an ink-jet recording system of a type that a recording liquid is ejected by the action of heat energy, the thermal properties (e.g., the specific heat, the coefficient of thermal expansion, the heat conductivity, etc.) of the recording liquid is controlled by suitably selecting the kind of the solvent of the recording liquid, the component ratio of the recording liquid, etc.

The recording liquid of this invention possess the following merits. That is, the physical properties such as viscosity, surface tension, etc., thereof are in the proper ranges, the recording liquid does not clog fine discharging orifices of an ink-jet recorder, the recording liquid provides recorded images having high density, the recording liquid does not cause change in physical properties or deposition of solid components during the storage of the liquid, the recording liquid can record on various recording media without restriction of the kind of the recording media, and also the recording liquid is fixed quickly and gives recorded images excellent in water resistance, light resistance, abrasion resistance and resolution.

Then, an ink-jet recording system is explained hereinbelow.

There are various ink-jet recording systems according to the difference in the method of generating recording droplets and of controlling the propulsion direction of the droplets.

Figure 1:
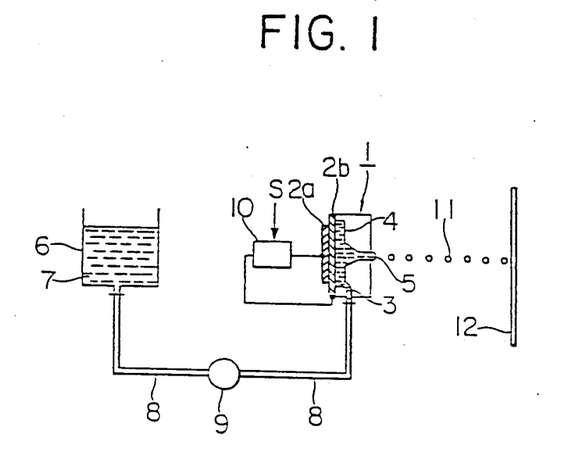
FIG. 1 and FIG. 2 are schematic views showing ink-jet recorders.

An example of the recording systems is shown in FIG. 1. That is, FIG. 1 is a schematic view showing an ink-jet recording system which performs recording by applying recording signals to the recording head having a piezo electric oscillator to generate droplets of recording liquid in response to the recording signals. As shown in FIG. 1, a recording head 1 is provided with a piezo electric oscillator 2a, a vibration plate 2b, an inlet 3 for a recording liquid, a liquid-holding chamber 4, and a discharging orifice 5. A recording liquid 7 stored in a storage tank 6 is introduced into the liquid chamber 4 through a feed pipe 8. In addition, as the case may be, an intermediate treating means 9 such as a pump, filter, etc., is equipped to the feed pipe 8. Pulsed signals converted from recording signals S by a signal-processing means 10 (e.g., a pulse convertor) are applied to the piezo electric oscillator 2a to vary the pressure of the recording liquid in the liquid chamber 4 in response to the pulsed signals, whereby the recording liquid 7 is ejected in the form of droplets 11 from the discharging orifice 5 to make a record on the surface of a recording medium 12.

Figure 2:
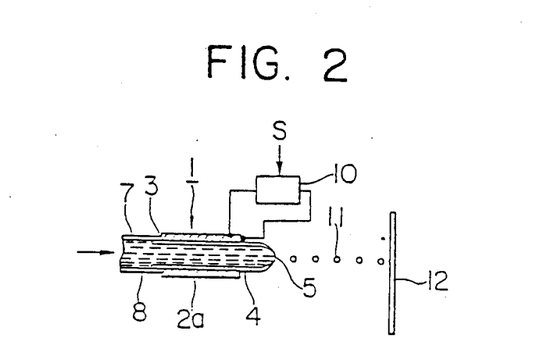

Besides the aforesaid ink-jet recording system, there are known various types of ink-jet recording systems. For example, FIG. 2 shows a modification in recording head 1 of the recording device shown in FIG. 1, in which a cylindrical piezo electric oscillator 2a is disposed around a nozzle-formed liquid-holding chamber 4. The mechanism of generating recording liquid droplets is fundamentally same as in the recording system shown in FIG. 1.

Moreover, there are known a ink-jet recording system in which electrically charged droplets are continuously generated and parts of the droplets are used for recording, and an ink-jet recording system in which thermal energy is applied to the recording liquid in the liquid chamber in a recording head in response to recording signals to generate droplets of the recording liquid by the thermal energy.

Figure 3A:
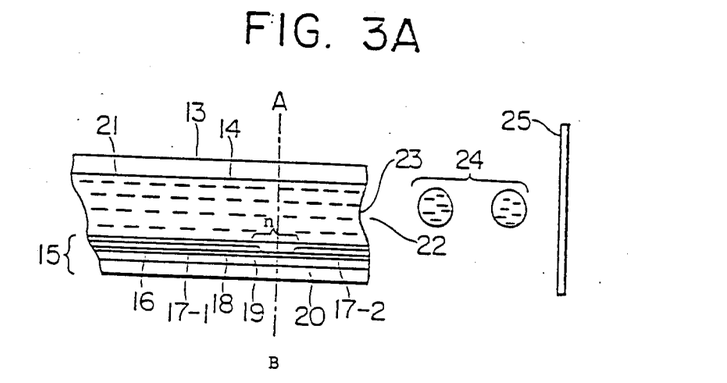
FIG. 3A is an enlarged sectional view of a head of an ink-jet recorder taken along the flowing passageway of ink.
Figure 3B:
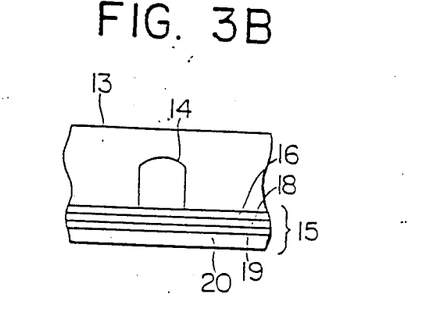
FIG. 3B is a cross sectional view taken along line A–B of the head shown by FIG. 3A.
Figure 4:
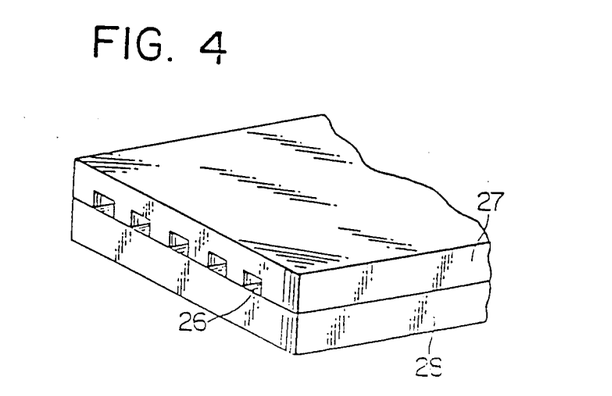
FIG. 4 is a perspective view of a multi-head which is an array of such heads as shown in FIGS. 3A and 3B.

An example of these recording systems is shown in FIG. 3A, FIG. 3B and FIG. 4.

A recording head 13 is composed of a glass, ceramic or plastic plate having an ink-passing channel 14 and a heating head 15, which is used for heat-sensitive recording, bonded to the plate. In addition, a thin film-type head is illustrated in FIG. 3A as the heating head 15 but the heating head for use in this invention is not restricted to the type. The heating head 15 is composed of a protective film 16 made of silicon oxide, etc., aluminum electrodes 17-1 and 17-2, a heating resistor layer 18 made of nichrome, etc., a heat accumulating layer 19, and a substrate 20 having a good heat radiating property, such as alumina, etc.

An ink 21 is filled in the channel 14 up to a discharging orifice 22 and forms a meniscus 23 by the action of pressure P.

Now, on applying electric signals onto the electrodes 17-1 and 17-2, the heating head 15 rapidly generates heat at the region shown by n to form bubbles in the ink 21 which is in contact with the region, the meniscus 23 of the ink is projected by the action of the pressure, and the ink 21 is ejected to a recording medium 25 from the discharging orifice 22 as recording droplets 24. FIG. 4 shows an external appearance of a multiple head composed of an array of a number of the recording heads shown in FIG. 3A. The multi-head is made by bonding a glass plate 27 having a number of channel 26 with a heating head similar to the one illustrated in FIG. 3A.

FIG. 3A is a cross sectional view of the recording head 13 taken along the passageway of ink and FIG. 3B is a cross sectional view taken along line A-B in FIG. 3A.

SYNTHESIS EXAMPLE 1

(Synthesis of Dye No. 1)

(1) Preparation of 1st diazo liquid:

To 446 ml of a 3% aqueous hydrochloric acid solution was added 22.3 g of 2-aminonaphthalene-5-sulfonic acid and the mixture was stirred for 3 hours to provide a uniform slurry. To the thus obtained slurry was added 200 g of ice to cool it to 3° C. and then to the slurry was added an aqueous solution of 7.3 g of sodium nitrite dissolved in 73 ml of water. Then, after stirring the mixture for one hour at 3° C. to perform the diazotization, remaining sodium nitrite was eliminated by the addition of 3 g of sulfamic acid to provide a 1st diazo liquid.

(2) Preparation of 2nd diazo liquid:

To 450 ml of water was added 22.3 g of 1,7-Cleve's acid having the formula and the mixture was stirred for 2 hours to provide a uniform slurry. To the slurry were added 300 g of ice, the 1st diazo liquid obtained in foregoing step (1), and 10 ml of a 25% aqueous sodium hydroxide solution and then the resultant mixture was stirred for 15 hours at 0° to 3° C. and at a pH of 2 to 3 to perform the coupling reaction. Thereafter, 200 g of sodium chloride was added to the coupling reaction product to perform salting out. The reaction product thus precipitated was collected by filtration, washed with 500 ml of a 10% aqueous sodium chloride solution and dried to provide 401 g of a monoazo compound having the formula:

To 500 ml of a 5% aqueous hydrochloric acid solution was added 25.0 g of the monozo compound thus obtained and after stirring the mixture for 5 hours to provide a uniform slurry, the slurry was cooled to 3° C. by the addition of 300 g of ice. An aqueous solution of 3.8 g of sodium nitrite dissolved in 38 ml of water was added to the slurry and after stirring the resultant mixture for 4 hours at 3° C. to perform the diazotization, remaining sodium nitrite was eliminated by the addition of 1 g of sulfamic acid to provide a 2nd diazo liquid.

(3) Coupling:

After adding 16.0 g 1-hydroxy-7-aminonaphthalene-3,6-disulfonic acid to 460 ml of water, the pH of the mixture was adjusted to 8–10 and the temperature was adjusted to 2°–5° C. by adding thereto 800 g of ice, 55 ml of a 25% aqueous sodium hydroxide solution and the 2nd diazo liquid obtained in the above step (2) to perform coupling.

After further stirring the reaction mixture for 5 hours at the same temperature and pH as above, 250 g of sodium chloride was added thereto to salt out a dye. The dye thus deposited was collected by filtration and washed with 300 ml of a 10% aqueous sodium chloride solution to provide 240 g of a wet cake. The wet cake was subjected to a desalting treatment and then dried to provide 35.5 g of the desired dye No. 1 with a yield of 81.3%.

The result of the elemental analysis was as follows.

|  | C | H | N |
| --- | --- | --- | --- |
| Calculated (%) | 41.1 | 1.9 | 8.0 |
| Found (%) | 41.3 | 1.8 | 7.9 |

SYNTHESIS EXAMPLE 2

(Synthesis of Dye No. 2)

(1) Preparation of 1st diazo liquid:

1st diazo liquid was prepared in the same manner as (1) in Synthesis Examples 1.

(2) Preparation of 2nd diazo liquid:

2nd diazo liquid was obtained by diazotizing the monoazo compound having the formula in the same manner as (2) in Synthesis Example 1 using the 1st diazo liquid and 1.6—Cleve's acid instead of 1.7—Cleve's acid.

(3) Coupling:

Dye No. 2 was obtained in the same manner as (3) in Synthesis Example 1 using 2nd diazo liquid obtained above (2) step in an amount of 35.4 g with a yield of 81.0%.

The result of the elemental analysis was as follows.

|  | C | H | N |
| --- | --- | --- | --- |
| Calculated (%) | 41.1 | 1.9 | 8.0 |
| Found (%) | 40.9 | 2.0 | 8.1 |

SYNTHESIS EXAMPLE 3

(Synthesis of Dye No. 6)

(1) Preparation of 1st diazo liquid:

To 600 ml of a 3% aqueous hydrochloric acid solutions was added 30.3 g of 2-aminonaphthalene-4,8-disulfonic acid and the mixture was stirred for 3 hours to provide a uniform slurry. The slurry was cooled to 3° C. by adding 200 g of ice. To the slurry was added an aqueous solution of 7.3 g of sodium nitrite dissolved in 73 ml of water. Then, after stirring the mixture for one hour at 3° C. to perform the diazotization, remaining sodium nitrite was eliminated by the addition of 3 g of sulfamic acid to provide a 1st diazo liquid.

(2) Preparation of 2nd diazo liquid:

To 450 ml of water was added 10.7 g of m-toluidine and the mixture was stirred for 2 hours to provide a uniform slurry. To the slurry was added 300 g of ice, the 1st diazo liquid obtained in foregoing step (1), and 10 ml of a 25% aqueous sodium hydroxide solution and then the resultant mixture was stirred for 15 hours at 0° to 3° C. and at pH of 2 to 3 to perform the coupling reaction. Thereafter, 200 g of sodium chloride was added to the coupling reaction product to perform salting out. The reaction product thus precipitated was collected by filtration, washed with 500 ml of a 10% aqueous sodium chloride solution and dried to provide 33.7 g of a monoazo compound having the formula:

To 450 ml of a 5% aqueous hydrochloric acid solution was added 21.1 g of the monoazo compound thus obtained and after stirring the mixture for 5 hours to provide a uniform slurry, the slurry was cooled to 3° C. by the addition of 300 g of ice. An aqueous solution of 3.8 g of sodium nitrite dissolved in 38 ml of water was added to the slurry and after stirring the resultant mixture for 4 hours at 3° C. to perform the diazotization, remaining sodium nitrite was eliminated by the addition of 1 g of sulfamic acid to provide a 2nd diazo liquid.

(3) Coupling:

After adding 19.8 g of 1-hydroxy-7-(3'-sulfophenyl)-aminonaphthalene-3-sulfonic acid to 400 ml of water, the pH of the mixture was adjusted to 8–10 and the temperature was adjust to 2°–5° C. by adding thereto 800 g of ice, 55 ml of a 25% aqueous sodium hydroxide solution and the 2nd diazo liquid obtained in the above step (2) to perform coupling.

After further stirring the reaction mixture for 5 hours at the same temperature and pH as above, 250 g of sodim chloride was added thereto to salt out a dye. The dye thus deposited was collected by filtration and washed with 300 ml of a 10% aqueous sodium chloride solution to provide 240 g of a wet cake. The wet cake was subjected to a desalting treatment and then dried to provide 36.4 g of the desired dye No. 6 with a yeild of 39.5%.

The result of the elemental analysis was as follows.

|  | C | H | N |
| --- | --- | --- | --- |
| Calculated (%) | 43.3 | 2.3 | 7.7 |
| Found (%) | 43.1 | 2.1 | 7.6 |

SYNTHESIS EXAMPLE 4

(Synthesis of Dye No. 7)

(1) Preparation of 1st diazo liquid:

1st diazo liquid was prepared in the same manner as (1) in Synthesis Example 3.

(2) Preparation of 2nd diazo liquid:

2nd diazo liquid was obtained by diazotizing the monoazo compound having the formula in the same manner as (2) in Synthesis Example 3 using the 1st diazo liquid and O-toluidine instead of m-toluidine.

(3) Coupling

Dye No. 7 was obtained in the same manner as (3) in Synthesis Example 3 using 2nd diazo liquid obtained above (2) step in an amount of 38.7 g with a yield of 84.5%.

The result of the elemental analysis was as follows.

|  | C | H | N |
| --- | --- | --- | --- |
| Calculated (%) | 43.3 | 2.3 | 7.7 |
| Found (%) | 43.5 | 2.3 | 7.6 |

EXAMPLE 1

| Ion-exchanged water (hereinafter, is referred simply to as water) | 71 wt. parts |
| --- | --- |
| Diethylene glycol | 25 wt. parts |
| Dye No. 1 | 4 wt. parts |
| Total | 100 wt. parts |

The foregoing components were sufficiently mixed in a vessel to dissolve the solid components and after filtering the mixture with a Teflon filter having micro pores of 1 micron of pore size under pressure, the filtrate was subjected to a degassing treatment using a vacuum pump to provide a recording liquid. The recording liquid thus obtained was subjected to following tests $T_1$ to $T_5$ using a recording device having on-demand type ink-jet recording heads for discharging droplets of a recording liquid by a piezo electric oscillator (the discharging orifice diameter of 50 microns, the piezo electric oscillator driving voltage of 60 volts, and the frequency of 4 KHz). The results were all satisfactory. In addition, when the same procedure as mentioned above was followed using Dye No. 6 in place of Dye No. 1, good results were obtained in all the test.

Test $T_1$: Long storage stability of recording liquid:

When the recording liquid was stored for 6 months at $-30°$ C. and $60°$ C. in a closed glass container, the deposition of insoluble matters was not observed and the properties and color tone of the liquid were unchanged.

Test $T_2$: Discharging stability:

When recording was performed by continuously ejecting the recording liquid for 24 hours in an atmosphere of room temperature, $5°$ C. and $40°$ C., high-quality recording could be stably performed throughout the test period under each condition.

Test $T_3$: Discharging response:

When the intermittent discharging of the recording liquid at two-second interval and the discharging after allowing to stand the recording liquid for 2 months were tested, no orifice top clogging occurred and stable and uniform recording was performed in each case.

Test $T_4$: Quality of recorded images:

The recorded images had high density and were clear. The density reduction percentage of the recorded images after exposing the images to a room lamp for 3 months was less than 1%. Also, when the recorded images were immersed in water for one minute, blotting of the images was very little.

Test $T_5$: Fixability for various kinds of recording media:

Recorded images formed on each of the recording papers shown in the following table were rubbed with a finger after 15 seconds since recording and the shift and blotting of the rubbed parts of the images were inspected. In each case, neither shift nor blotting of the images was observed, which showed the excellent fixability of the recording liquid.

| Tradename of paper | Paper grade | Maker |
| --- | --- | --- |
| Ginwa | High quality paper | Sanyo Kokusaku Pulp Co., Ltd. |
| Seven Star | High quality paper | Hokuetsu Seishi K.K. |
| Haku Botan | Medium quality | Honshu Seishi K.K. |
| Toyo Filter Paper No. 4 | Non-sized paper | Toyo Roshi K.K. |

EXAMPLE 2

| | |
| --- | --- |
| Water | 62 wt. parts |
| N—methyl-2-pyrrolidone | 15 wt. parts |
| Diethylene glycol | 19 wt. parts |
| Dye No. 2 | 4 wt. parts |
| Total | 100 wt. parts |

A recording liquid having the above components was prepared by the same manner as in Example 1 and subjected to Test $T_1$ to $T_5$ as in Example 1 using a recording device having an on-demand type multiple head (the discharging orifice diameter of 35 microns, the heating resistor resistance of $150\Omega$, the driving voltage of 30 volts, and frequency of 2 KHz) for recording by applying thermal energy to a recording liquid in the recording head to generate droplets of the recoding liquid. The results are excellent in all the tests. The same procedure of this example was followed using Dye No. 7 in place of by No. 2 and the excellent results were obtained in all the tests.

EXAMPLE 3

| | |
| --- | --- |
| Water | 45 wt. parts |
| Ethylene glycol | 20 wt. parts |
| 1,3-Dimethyl-2-imidazolidinone | 30 wt. parts |
| Dye No. 3 | 5 wt. parts |
| Total | 100 wt. part |

A recording liquid having the above composition was prepared by the same manner as in Example 1 and subjected to Tests $T_1$ to $T_5$ as in Example 2. The results were excellent in all the tests. This example was followed in the same manner except using Dye No. 8 in place of Dye No. 3 and the excellent results were obtained in all the tests.

EXAMPLE 4

| | |
| --- | --- |
| Water | 60 wt. parts |
| Diethylene glycol | 36 wt. parts |
| Dye No. 4 | 4 wt. parts |
| Total | 100 wt. parts |

A recording liquid having the above components was prepared by the same manner as in Example 1 and subjected to Test $T_1$ to $T_5$ as in Example 2. The results were excellent in all the tests. This example was followed in the same manner except using Dye No. 9 in place of Dye No. 4 and the good results were obtained in all the tests.

EXAMPLE 5

| | |
| --- | --- |
| Water | 66 wt. parts |
| Diethylene glycol monomethyl ether | 30 wt. parts |
| Dye No. 5 | 4 wt. parts |
| Total | 100 wt. parts |

A recording liquid having the above components was prepared by the same manner as in Example 1 and subjected to Tests $T_1$ to $T_5$ as in Example 2. The results were excellent in all the tests. The same procedure of this example was followed using Dye No. 10 in place of Dye No. 5 and the good results were obtained in all the test.

EXAMPLE 11 TO 13

Recording liquids having the components shown in Table 3 below as Examples 11 to 13 were prepared by the same manner as in Example 1. Each of the recording liquids was filled in a felt pen and after writing on a medium quality paper (Haku Botan, trade name, made by Honshu Seishi K.K.) using each recording liquid, the water resistance of the written images was tested. Furthermore, the writing property of each recording liquid after allowing to stand the felt pen for 24 hours without the cap was tested.

The recording liquids in the examples were excellent in water resistance and writing property after allowing to stand. The results are shown in Table 1 below.

TABLE 1

| Example No. | Recording liquid component | wt. part |
|---|---|---|
| 11 | Water | 71 |
|  | Diethylene glycol | 25 |
|  | Dye No. 11 | 4 |
|  | Total | 100 |
| 12 | Water | 45 |
|  | Ethylene glycol | 20 |
|  | N—methyl-2-pyrrolidone | 30 |
|  | Dye No. 12 | 5 |
|  | Total | 100 |
| 13 | Water | 50 |
|  | Polyethylene glycol | 10 |
|  | Diethylene glycol | 35 |
|  | Dye No. 13 | 5 |
|  | Total | 100 |

While the invention has been described in detail and with reference to specifid embodiments thereof, it will be apparent to one skilled in the art that various changes and modifications can be made therein without departing from the spirit and the scope thereof.

What is claimed is:

1. A recording liquid comprising at least one of naphthalenedisazoic dyes represented by general formula (I) and a liquid medium for dissolving and dispersing the dye;

(I)

wherein Q represents or a naphthalene group substituted by —SO₃M; R represents a methyl group, a methoxy group on, an ethoxy group; X represents a hydrogen atom, a phenyl group substituted by —SO₃M; m represents 1 or 2; n represents 1 when X represents a hydrogen atom and N represents O when X represents a phenyl group substituted by —SO₃M, wherein X represents a hydrogen atom and m represents 1 when Q represents a naphthalene group substituted by —SO₃M; and M represents an alkali metal atom, an ammonium, or H.A. (wherein A represents an amine).

2. The recording liquid as claimed in claim 1, wherein the dye is represented by the following formula (A);

wherein M represents an alkali metal atom, an ammonium, or H.A (wherein A represents an amine).

3. The recording liquid as claimed in claim 1, wherein the dye is represented by the following formula [B];

wherein R represents a methyl group, a methoxy group, an ethoxy group; X represents a hydrogen atom, a phenyl group substituted by —SO₃M; m represents 1 or 2; n represents 1 when X represents a hydrogen atom and N represents zero when X represents a phenyl group substituted by —SO₃M; and M represents an alkali metal atom, an ammonium, or H.A (wherein A represents an amine).

4. The recording liquid as claimed in claim 3, wherein R is a methyl group and X is a phenyl group substituted by —SO₃M.

5. The recording liquid as claimed in claim 1, wherein said alkali metal atom is an atom selected from the group consisting of Na, Li and K.

6. The recording liquid as claimed in claim 1, wherein said amine represented by A is triethanolamine.

7. The recording liquid as claimed in claim 2, wherein said dye is represented by the formula 8. The recording liquid as claimed in claim 3, wherein the dye is represented by the formula

9. The recording liquid as claimed in claim 3, wherein said dye is represented by the formula

10. The recording liquid as claimed in claim 1, wherein said liquid medium is a liquid selected from the group consisting of water and a mixture of water and a water-soluble organic solvent.

11. The recording liquid as claimed in claim 1, wherein the content of the dye is 0.1 to 20% by weight to the total weight of the recording liquid.

12. The recording liquid as claimed in claim 10, wherein the content of the water-soluble organic solvent is 5 to 89.9% by weight to the total weight of the recording liquid.

13. The recording liquid as claimed in claim 10, wherein the liquid medium is a mixture of water and a water-soluble organic solvent, and the content of water is 10 to 90% by weight to the total weight of the recording liquid.

14. The recording liquid as claimed in claim 1, wherein the recording liquid further contains at least one of a viscosity controlling agent, a surface active agent, a surface tension controlling agent, a pH controlling agent, an fungicide agent, and a specific resistance controlling agent.

15. A naphthalenedisazoic dye represented by general formula (I);

(I)

wherein Q represents or a naphthalene group substituted by —SO$_3$M; R represents a methyl group, a methoxy group, an ethoxy group; X represents a hydrogen atom, a phenyl group substituted by —SO$_3$M; m represents 1 or 2; n represents 1 when X represents a hydrogen atom and n represents zero when X represents a phenyl group substituted by —SO$_3$M, wherein X represents a hydrogen atom and m represents 1 when Q represents a naphthalene group substituted by —SO$_3$M; and M represents an alkali metal atom, an ammonium, or H.A. (wherein A represents an amine).

16. The dye as claimed in claim 15, wherein the dye is represented by the following formula (A);

(A)

wherein M represents an alkali metal atom, an ammonium, or H.A (wherein A represents an amine).

17. The dye as claimed in claim 15, wherein the dye is represented by the following formula (B);

(B)

wherein R represents a methyl group, a methoxy group, an ethoxy group; X represents a hydrogen atom, a phenyl group substituted by —$SO_3M$; m represents 1 or 2; n represents 1 when X represents a hydrogen atom and n represents zero when X represents a phenyl group substituted by —$SO_3M$. and M represents an alkali metal atom, an ammonium, or H.A (wherein A represents an amine).

18. The dye as claimed in claim 17, wherein R is a methyl group and X is a phenyl group substituted by —$SO_3M$.

19. The dye as claimed in claim 15, wherein said alkali metal atom is an atom selected from the group consisting of Na, Li and K.

20. The dye as claimed in claim 15, wherein said amine represented by A is triethanolamine.

21. The dye as claimed in claim 16, wherein said dye is represented by the formula

22. The dye as claimed in claim 17, wherein said dye is represented by the formula

23. The dye as claimed in claim 17, wherein said dye is represented by the formula

* * * * *

UNITED STATES PATENT AND TRADEMARK OFFICE
CERTIFICATE OF CORRECTION

PATENT NO. : 4,724,001
DATED : February 9, 1988
INVENTOR(S) : TOKUYA OHTA, ET AL.

It is certified that error appears in the above-identified patent and that said Letters Patent is hereby corrected as shown below:

AT [56] IN THE REFERENCES

Other Publications, "Patent No. 60243176, Mar. 12, 1985." should read
--Patent No. 60-243176, Dec. 3, 1985.--.

COLUMN 3

Line 12, "and repre-" should read --and n repre---.

COLUMN 8

Line 54, "" should read ----.

M': $NH(C_2H_4OH)_3$

UNITED STATES PATENT AND TRADEMARK OFFICE
CERTIFICATE OF CORRECTION

PATENT NO. : 4,724,001

DATED : February 9, 1988

INVENTOR(S) : TOKUYA OHTA, ET AL.

It is certified that error appears in the above-identified patent and that said Letters Patent is hereby corrected as shown below:

<u>COLUMN 9</u>

Lines 6-10, "  "

$SO_3M$    should read

--  --.

$SO_3M$

Lines 18-22, "  "

$(SO_3M)_m$    should read

--  --.

$(SO_3M)_m$

UNITED STATES PATENT AND TRADEMARK OFFICE
CERTIFICATE OF CORRECTION

PATENT NO. : 4,724,001
DATED : February 9, 1988
INVENTOR(S) : TOKUYA OHTA, ET AL.

It is certified that error appears in the above-identified patent and that said Letters Patent is hereby corrected as shown below:

COLUMN 9

Lines 29-34,  should read

COLUMN 20

Line 2, "group on," should read --group, or--.
Line 5, "N" should read --n--.
Line 6, "O" should read --zero--.
Line 32, "[B];" should read --(B);--.
Line 44, "N" should read --n--.

COLUMN 22

Line 10, "(I)" should be deleted.
Line 24, --(I)-- should be inserted at right margin of Column 22, line 24.

UNITED STATES PATENT AND TRADEMARK OFFICE
CERTIFICATE OF CORRECTION

PATENT NO. : 4,724,001            Page 4 of 4

DATED : February 9, 1988

INVENTOR(S) : TOKUYA OHTA, ET AL.

It is certified that error appears in the above-identified patent and that said Letters Patent is hereby corrected as shown below:

COLUMN 23

Line 15, "$-SO_3M$." should read ---$SO_3M$,--.

Signed and Sealed this

Twelfth Day of July, 1988

*Attest:*

DONALD J. QUIGG

*Attesting Officer*      *Commissioner of Patents and Trademarks*